United States Patent
Hussein et al.

(10) Patent No.: US 7,658,962 B2
(45) Date of Patent: Feb. 9, 2010

(54) COOKING CREAM

(75) Inventors: Ahmed Hussein, Niagara Falls (CA); Anupam Malhotra, Tonawanda, NY (US)

(73) Assignee: Rich Products Corporation, Buffalo, NY (US)

( * ) Notice: Subject to any disclaimer, the term of this patent is extended or adjusted under 35 U.S.C. 154(b) by 0 days.

(21) Appl. No.: 10/235,501

(22) Filed: Sep. 6, 2002

(65) Prior Publication Data

US 2004/0047966 A1 Mar. 11, 2004

(51) Int. Cl.
*A23C 9/00* (2006.01)

(52) U.S. Cl. ............... 426/585; 426/580; 426/586; 426/570

(58) Field of Classification Search .......... 426/564, 426/569, 570, 580, 585, 586, 661
See application file for complete search history.

(56) References Cited

U.S. PATENT DOCUMENTS

| | | | |
|---|---|---|---|
| 3,968,267 A | 7/1976 | Ogasa et al. ............ 426/570 |
| 4,360,535 A | 11/1982 | Darling et al. ............ 426/570 |
| 4,461,777 A | 7/1984 | Murase et al. ............ 426/330.6 |
| 4,637,937 A | 1/1987 | Terada et al. ............ 426/570 |
| 4,744,992 A | 5/1988 | Mitchell et al. ............ 426/29 |
| 4,888,194 A | 12/1989 | Andersen et al. ............ 426/570 |
| 4,971,826 A | 11/1990 | Kato et al. ............ 426/602 |
| 5,149,557 A | 9/1992 | Morrison et al. ............ 426/570 |
| 5,190,781 A | 3/1993 | Van Heteren et al. ....... 426/521 |
| 5,290,581 A | 3/1994 | Campbell et al. ............ 426/570 |
| 5,336,514 A | 8/1994 | Jones et al. ............ 426/564 |
| 5,366,751 A | 11/1994 | Pordy ............ 426/580 |
| 5,378,489 A | 1/1995 | Kurihara et al. |
| 5,478,587 A | 12/1995 | Mingione ............ 426/565 |
| 5,609,904 A | 3/1997 | Koh et al. ............ 426/565 |
| 5,690,986 A | 11/1997 | Okutomi et al. ............ 426/604 |
| 5,759,609 A | 6/1998 | Lynch ............ 426/570 |
| 6,117,473 A | 9/2000 | Leshik et al. ............ 426/564 |
| 6,139,896 A | 10/2000 | Daenzer-Alloncle et al. ............ 426/586 |
| 6,228,417 B1 | 5/2001 | Hidaka et al. ............ 426/601 |
| 6,649,207 B2 * | 11/2003 | Coote et al. ............ 426/602 |
| 6,824,810 B2 * | 11/2004 | Sargent et al. ............ 426/588 |
| 2003/0104110 A1 * | 6/2003 | Sikking et al. ............ 426/604 |
| 2007/0071874 A1 * | 3/2007 | Cash et al. ............ 426/601 |

FOREIGN PATENT DOCUMENTS

| | | |
|---|---|---|
| EP | 0 737 425 | 10/1996 |
| GB | 1 232 640 | 5/1971 |
| GB | 2 014 426 | 8/1979 |
| JP | 58-212752 | 12/1983 |
| JP | 61-219342 A | 9/1986 |
| JP | 62-275646 | 11/1987 |
| JP | 63-7757 | 1/1988 |
| JP | 1994026513 B2 | 4/1994 |

OTHER PUBLICATIONS

HU 9603157 A2, English Abstract, published Aug. 28, 1998.

* cited by examiner

*Primary Examiner*—Leslie Wong
(74) *Attorney, Agent, or Firm*—Hodgson Russ LLP

(57) ABSTRACT

A cooking cream was prepared that is useful for cooking and preferably has a good whipping capability also. The cream comprises about 55 to 93% by weight water, about 5 to 45% by weight fat, about 1 to 10% by weight protein, about 0.5 to 10% by weight starch, and an effective amount of emulsifier. Preferably, the cream also contains an effective amount of stabilizer and an effective amount of buffer.

30 Claims, No Drawings

COOKING CREAM

FIELD OF THE INVENTION

The invention relates to cooking creams. More particularly, the invention relates to non-dairy creams that are stable at cooking temperatures. Preferably, the cooking creams are whippable.

BACKGROUND OF THE INVENTION

Cooking creams have become popular substitutes for dairy creams in part because a large number of people are either unable or unwilling to consume dairy products. Cooking creams also offer certain advantages over dairy creams, such as better shelf life and consistent quality and price. Cooking creams also commonly lack high temperature stability, which is an important characteristic for creams that are used in cooking.

SUMMARY OF THE INVENTION

The invention is a cooking cream that is useful for cooking and preferably has a good whipping capability also. The cream comprises about 55 to 93% by weight water, about 5 to 45% by weight fat, about 1 to 10% by weight protein, about 0.5 to 10% by weight starch, and an effective amount of emulsifier. Preferably, the cream also contains an effective amount of stabilizer and an effective amount of buffer.

DETAILED DESCRIPTION OF THE INVENTION

The invention relates to edible oil-in-water cooking creams comprising about 55 to 93% by weight water, about 5 to 45% by weight fat, about 1 to 10% by weight protein, about 0.5 to 10% by weight starch, and an effective amount of emulsifier. Preferably, the cream also contains an effective amount of stabilizer and an effective amount of buffer.

A "cooking cream" composition, as the term is used herein, describes a cream that can be used for cooking at elevated temperatures; however, the term is not limited to creams of the invention that are used for other purposes, such as a cream used as a whip topping.

An "effective amount" of emulsifier is one that is capable of inducing the formation of a stable emulsion. Preferably, it also improves the rate and total aeration obtained. Preferably, the amount of emulsifier is about 0.1 to 2% by weight of the cream.

An "effective amount" of stabilizer is one that is capable improving the body and texture of toppings. Preferably, it can also reduce separation and aid in providing freeze-thaw stability. Preferably, the amount of stabilizer is about 0.01 to 2% by weight of the cream.

An "effective amount" of buffer is one that is capable of controlling the pH. Preferably, it also increases the stability of the cream. Preferably, the amount of buffer is about 0.05 to 2% by weight of the cream.

Preferably, a cream according to the invention comprises the following components:

| Component | Weight % (preferred) | Weight % (more preferred) |
|---|---|---|
| Fat | 5-45 | 8-40 |
| Stabilizer | 0.01-2 | 0.2-0.6 |
| Emulsifier | 0.1-2 | 0.5-1 |
| Protein | 1-10 | 2-7 |
| Starch | 0.5-10 | 1-6 |
| Buffer | 0.05-2 | 0.1-1 |
| Water | 55-93 | 60-80 |

More preferably, the cream comprises the following components:

| Ingredient | Weight % |
|---|---|
| Hydrogenated Palm Kernel Oil or Anhydrous Milk Fat | 10-45 |
| Butter Milk Powder or Non-Fat Dry Milk | 2-5 |
| Starch | 1-5 |
| Malto Dextrin 15 DE or Maltrin 180 | 0.5-3 |
| Soy lecithin E 322 or Mono and diglycerides or Sorbitan monosterate | 0.1-1 |
| Guar Gum E-412 or Xanthan Gum | 0.1-1 |
| Polysorbate 60 or Polysorbate 65 or Polysorbate 80 | 0.1-1 |
| Locust bean gum or Methyl cellulose | 0.05-0.5 |
| Disodium Phosphate or Dipotassium phosphate | 0.1-1 |
| Water | Balance to 100 |

More preferably, the cream comprises the following components:

| Ingredients | Weight % |
|---|---|
| Hydrogenated Palm Kernel Oil or Anhydrous Milk Fat | 20-35 |
| Butter Milk Powder | 4 |
| Starch | 1 |
| Malto Dextrin 15 DE | 1-1.5 |
| Soy lecithin E 322 | 0.1-0.2 |
| Guar Gum E-412 | 0.1-0.2 |
| Polysorbate 60 | 0.15-0.25 |
| Mono and diglycerides | 0.15-0.25 |
| Locust bean gum E 410 | 0.05-0.1 |
| Disodium Phosphate | 0.10 |
| Water | Balance to 100 |

The cream preferably contains about 10% to about 60% total solids, more preferably about 20% to about 45% total solids, more preferably about 30% total solids.

The protein component may also be selected from numerous sources. Sources include non-fat dry milk (low heat), non-fat dry milk (high heat), caseinates, whey protein isolates, butter milk powder, soy proteins, and milk protein concentrate. Preferred protein sources include non-fat dry milk, caseinates and butter milk powder. More than one protein component may be selected as desired.

The fat component may be selected from numerous sources. The term fat is not intended to exclude oils or to impart any meaning as to the physical state (i.e., liquid or solid) of the component used as the fat. The fat component may be selected from plant oils, such as soybean oil, sunflower oil, canola oil, palm oil, palm kernel oil, coconut oil, safflower oil, corn oil, olive oil, peanut oil and cottonseed oil; it may also be selected from animal fats, such as, lard, tallow, and dairy fat. Combinations of more than one fat is also possible in the present invention.

The fat may also be modified for use in the present invention. The possible modification includes fractionation, complete hydrogenation, partial hydrogenation and interesterification. Such modifications are well known in the art.

The stabilizer may also be selected from numerous sources. Sources include carageenan, locust bean gum, guar gum, xanthan gum, sodium alginate, carboxy methylcellulose, hydroxy propyl methyl cellulose, hydroxy propyl cellulose and modified cellulose. Preferred stabilizer sources include guar gum, locust bean gum and xanthan gum.

Numerous emulsifiers may be used in the present invention. Preferred emulsifiers include polysorbate 60, polysorbate 65, polysorbate 80, lecithin, steryl lactalates, monoglycerides, diglycerides, polyglycerides, sorbitan monosterate and diacetyl ester of tartaric acid. As is demonstrated in the examples given below, it is often preferable to use more than one emulsifier.

The starch component may also be selected from numerous sources. Sources of starch include corn, potato, maize, wheat, rice, tapioca and sorghum. One of ordinary skill in the art will appreciate that it is common practice to modify starches to enhance characteristics such as storability or purity. More than one starch may be used in the present invention.

Numerous buffers may also be used in the present invention. Preferred buffering salts include disodium phosphate, dipotassium phosphate, disodium hexaphosphate, and sodium citrate. More than one buffer may be used in the present invention.

In one embodiment of the invention, the cream is used as a cooking cream. In this embodiment, the invention is stable at about 90° C. for at least 5 minutes, preferably at least 10 minutes. The cooking cream is not only stable at high temperatures as an end-product, but also as it is being processed. The cooking cream is able to withstand an ultra high temperature (UHT) treatment of about 280-290° F. Production using UHT increases many favorable attributes, such as a longer shelf life. It should be apparent that the present invention may be made using means other than UHT, such as pasteurization, but may not have a marked increase in attributes.

In another embodiment of the invention, the cream is used as a whip topping. This aspect of the invention may consist of a base composition that is substantially free of sugar. Alternatively, the whip topping could contain sugar or other sweeteners. For the base composition, it is envisioned that consumers would add sugar to achieve desired sweetness and the whipped product would have an overrun of at least about 210%. Preferably, the topping is capable of an overrun of about 210-290%.

There are numerous components whose levels and types may be changed or added to the present invention to tailor it to the desires of the end user. Such components include emulsifiers to control overrun and whipping time, stabilizers to stabilize the emulsion and to achieve the desired texture, starch to give consistency to the cream, proteins for the dairy flavor and emulsification and buffer to control pH. pH is preferably maintained in the range of about 6.5-7.

In a preferred embodiment, the present invention is also either free of, or substantially free of, dairy fat.

EXAMPLES

The following examples are not intended to be limiting, but rather illustrative of some approaches taken and, of course, which may be varied in accordance with the spirit and scope of this description.

Example 1

| Ingredient | Weight % |
|---|---|
| Hydrogenated Palm Kernel Oil | 20 |
| Butter Milk Powder | 4 |
| Waxy Maize Starch ("Thin n Thik 99") | 1 |
| Malto Dextrin 15 DE | 1.3 |
| Soy lecithin E 322 | 0.15 |
| Guar Gum E-412 | 0.15 |
| Polysorbate 60 | 0.2 |
| Locust bean gum | 0.075 |
| Disodium Phosphate | 0.1 |
| Water | Balance to 100 |

A 600 kg quantity of the above-described finished product was prepared according to the following procedure. A 437 kg quantity of water was metered into a steam-jacketed kettle with a medium agitator speed. 17 kg of premix (the premix contained (w/w) 35.39% starch, 46.02% maltodextrin, 5.31% guar gum, 7.08% mono and diglycerides, 2.65% locust bean gum and 3.54% disodium phosphate) were dispersed completely into the water. To this solution, 24 kg of butter milk powder and 1.2 kg of polysorbate 60 was added with a thorough mixing. 120 kg of melted palm kernel oil (165° F.) was then pumped into the kettle and mixed thoroughly. 0.9 kg of lecithin was then added. The resultant mixture was brought to 150° F.

This mixture was then preheated in a tube heat exchanger to a temperature of about 170-200° F. before UHT treatment of about 280-290° F., using either a steam injection or a tube heat exchanger. The mixture was flash cooled and homogenized in a two stage homogenizer (first stage: about 500 psi; second stage: about 1000 psi) and then finally cooled in two stages in a tube heat exchangers to a temperature of about 50 to 60° F. prior to packaging for storage at about 40 to 60° F.

The resulting product from Example 1 has creamy yellow/off white color, pourable consistency and creamy mouth feel. The product has (w/w) 27.9% total solids, 6.5 pH, 1.021 specific gravity, 475 Cp viscosity.

The product was tested for the performance on a refrigerated cake and in a refrigerated container. Product performed well for 5 days, according to typical standards known and used in the art, such as stability and spreadability. Additionally, rosettes were formed at an interval of 15 minutes for 1 hour and were observed for its sharpness, smoothness and firmness. Rosettes remained good for one hour.

The product was stable in cooking applications at 90° C. for 10 minutes. Moreover, the product has a shelf life of 180 days at 5-10° C. and 30 days at 27° C.

The following whipping test results were obtained:

| Machine | Speed | Sugar (weight %) | Overrun %/ Whip Time (Mins) |
|---|---|---|---|
| Hobart Machine | 2 | 10 | 275/15 |
| Kitchen Aid Mixer | 6 | 10 | 295/15 |
| Hand Electric Blender | N/A | 10 | 155/12 |

Example 2

| Ingredient | Weight % |
|---|---|
| Anhydrous milk fat | 35 |
| Butter Milk Powder | 4 |
| Waxy Maize Starch ("Thin n Thik 99") | 1 |
| Malto Dextrin 15 DE | 1.3 |
| Soy lecithin E 322 | 0.15 |
| Guar Gum E-412 | 0.15 |
| Polysorbate 60 | 0.2 |
| Locust bean gum | 0.075 |
| Disodium Phosphate | 0.1 |
| Water | Balance to 100 |

A 600 kg quantity of the above-described finished product was prepared according to the following procedure. A 346 kg quantity of water was metered into a steam-jacketed kettle with a medium agitator speed. 17 kg of premix (the premix is comprised of (w/w) 35.39% starch, 46.02% maltodextrin, 5.31% guar gum, 7.08% mono and diglycerides, 2.65% locust bean gum and 3.54% disodium phosphate) were dispersed completely into the water. To this solution, 24 kg of butter milk powder and 1.2 kg of polysorbate 60 was added with a thorough mixing. 210 kg of anhydrous milk fat was then pumped into the kettle and mixed thoroughly. 0.9 kg of lecithin was then added. The resultant mixture was brought to 150° F.

This mixture was then preheated in a tube heat exchanger to a temperature of about 170-200° F. before UHT treatment of about 280-290° F., using either a steam injection or a tube heat exchanger. The mixture was flash cooled and homogenized in a two stage homogenizer (first stage: about 500 psi; second stage: about 1000 psi) and then finally cooled in two stages in a tube heat exchangers to a temperature of about 50 to 60° F. prior to packaging for storage at about 40 to 60° F.

What is claimed is:

1. A pourable cooking cream consisting essentially of about 55 to 93% by weight water, about 5 to 45% by weight of a fat component selected from the group consisting of palm kernel oil, coconut oil and combinations thereof, and wherein said fat component comprises all of the fat in the cooking cream, about 1 to 10% by weight protein, about 0.5 to 10% by weight starch selected from the group consisting of corn, maize, potato, wheat, rice, tapioca sorghum, and combinations thereof, an effective amount of emulsifier, an effective amount of stabilizer and an effective amount of buffering agent, wherein the pourable cooking cream is stable for at least 5 minutes at 90° C., and wherein the cooking cream is capable of being whipped.

2. The cooking cream of claim 1, wherein the stabilizer is about 0.01 to 2% by weight, the emulsifier is about 0.1 to 2% by weight, and the buffering agent is about 0.05 to 2% by weight.

3. The cooking cream of claim 1, wherein the water is about 60 to 80% by weight, the fat is about 8 to 40% by weight, the protein is about 2 to 7% by weight, the starch is about 1 to 6% by weight, the stabilizer is about 0.2 to 0.6% by weight, the emulsifier is about 0.5 to 1% by weight, and the buffering agent is about 0.1 to 1% by weight.

4. The cooking cream of claim 1, wherein the fat is palm kernel oil.

5. The cooking cream of claim 1, wherein the protein is selected from the group consisting of non-fat dry milk, caseinates, whey protein isolates, butter milk powder, soy proteins, milk protein concentrate, and mixtures thereof.

6. The cooking cream of claim 1, wherein the stabilizer is selected from the group consisting of carageenan, locust bean gum, guar gum, xanthan gum, sodium alginate, carboxy methyl cellulose, hydroxy propyl methyl cellulose, hydroxy propyl cellulose, modified cellulose, and mixtures thereof.

7. The cooking cream of claim 1, wherein the emulsifier is selected from the group consisting of polysorbate 60, polysorbate 65, polysorbate 80, lecithin, stearyl lactates, monoglycerides, diglycerides, polyglycerides, sorbitan monosterate, diacetyl ester of tartaric acid and mixtures thereof.

8. The cooking cream of claim 1, wherein the buffering agent is selected from the group consisting of disodium phosphate, dipotassium phosphate, disodium hexaphosphate, sodium citrate, and mixtures thereof.

9. The cooking cream of claim 1, wherein the cream has an overrun of at least about 210% when whipped.

10. The cooking cream of claim 1, wherein the cream has an overrun of about 210-290% when whipped.

11. A pourable cooking cream consisting essentially of about 55 to 93% by weight water, about 5 to 45% by weight of a fat component selected from the group consisting of palm kernel oil, coconut oil and combinations thereof, and wherein said fat component comprises all of the fat in the cooking cream, about 1 to 10% by weight protein, about 0.5 to 10% by weight starch selected from the group consisting of corn, maize, potato, wheat, rice, tapioca, sorghum and combinations thereof, an effective amount of emulsifier, an effective amount of stabilizer, an effective amount of buffering agent and a sweetener, wherein the pourable cooking cream is stable for at least 5 minutes at 90° C., and wherein the cooking cream is capable of being whipped.

12. The cooking cream of claim 11, wherein the sweetener is selected from the group consisting of corn syrup, fructose, sucrose, and dextrose.

13. The cooking cream of claim 1, wherein the cooking cream is stable for at least 10 minutes at 90° C.

14. The cooking cream of claim 1, wherein the cooking cream is miscible with an aqueous solution.

15. A method for preparing a pourable cooking cream consisting essentially of the steps of dissolving in about 55 to 93% heated water, based on the total weight of the cooking cream, about 5 to 45% of a fat component selected from the group consisting of palm kernel oil, coconut oil and combinations thereof, and wherein said fat component comprises all of the fat in the cooking cooking cream, about 1 to 10% protein, about 0.5 to 10% starch selected from the group consisting of corn, maize, potato, wheat, rice, tapioca, sorghum and combinations thereof, an effective amount of emulsifier, an effective amount of stabilizer and an effective amount of buffer to form a solution; and processing the solution, thereby forming a pourable cooking cream.

16. The method of claim 15, wherein the stabilizer is about 0.01 to 2%, the buffer is about 0.05 to 2% and the emulsifier is about 0.1 to 2%.

17. The method of claim 15, wherein the processing step is preheating of the solution, and then heating to an ultra high temperature.

18. The method of claim 17, wherein the preheating step is heating the solution to about 170-200° F. and the ultra high temperature is about 280-290° F.

19. The method of claim 15, wherein the processing step is homogenizing the solution.

20. The method of claim 19, wherein the homogenizing step is exerting a first stage pressure on the solution of about 500 psi, exerting a second stage pressure of about 1000 psi and cooling the solution.

21. The cooking cream of claim 1, wherein the water is about 55 to about 75% by weight, the fat is about 20 to about 35% by weight, the protein is about 2 to about 7% by weight, and the starch is about 0.5 to about 5% by weight.

22. The cooking cream of claim 21, wherein the starch is about 0.5 to about 1% by weight.

23. The cooking cream of claim 22, wherein the stabilizer is about 0.2 to about 0.6% by weight, the emulsifier is about 0.5 to about 1% by weight, and the buffering agent is about 0.1 to about 1% by weight.

24. The cooking cream of claim 1, wherein the fat is about 20 to about 30% by weight.

25. The cooking cream of claim 1, wherein the cooking cream is suitable as a whip cream.

26. The cooking cream of claim 25, wherein the cream, when whipped, is stable for up to 5 days at 5-10° C.

27. The cooking cream of claim 22, wherein the cooking cream is suitable as a whip cream.

28. The cooking cream of claim 27, wherein the cream, when whipped, is stable for up to 5 days at 5-10° C.

29. The cooking cream of claim 27, wherein the cream, when whipped, is stable for 3 to 5 days at 5-10° C.

30. The cooking cream of claim 22, wherein the fat is palm kernel oil.

* * * * *